United States Patent [19] [11] Patent Number: 4,732,730
Gorscak et al. [45] Date of Patent: Mar. 22, 1988

[54] STUCK FUEL ROD CAPPING SLEEVE

[75] Inventors: Donald A. Gorscak, Bethel Park; John J. Maringo, McKeesport; Roy J. Nilsen, Upper St. Clair, all of Pa.

[73] Assignee: The United States of America as represented by the United States Department of Energy, Washington, D.C.

[21] Appl. No.: 861,399

[22] Filed: May 9, 1986

[51] Int. Cl.$^4$ .................... G21C 9/00; B65D 41/04
[52] U.S. Cl. .................... 376/277; 376/440; 376/451; 376/463; 220/288
[58] Field of Search ............ 376/463, 277, 440, 451, 376/457, 261, 414, 416, 417; 220/288, 254

[56] References Cited

U.S. PATENT DOCUMENTS 1,319,136 10/1919 Bieker ..................... 220/288 X
3,222,256 12/1965 Fletcher et al. ............ 376/451
3,828,868 8/1974 Jabsen ..................... 376/440
4,428,903 1/1984 Kasik et al. ............... 376/261
4,452,755 6/1984 Hylton ..................... 376/440 X Primary Examiner—John F. Terapane
Assistant Examiner—John S. Maples
Attorney, Agent, or Firm—Earl T. Reichert; Judson R. Hightower; Richard E. Constant

[57] ABSTRACT

A stuck fuel rod capping sleeve to be used during derodding of spent fuel assemblies if a fuel rod becomes stuck in a partially withdrawn position and, thus, has to be severed. The capping sleeve has an inner sleeve made of a lower work hardening highly ductile material (e.g., Inconel 600) and an outer sleeve made of a moderately ductile material (e.g., 304 stainless steel). The inner sleeve may be made of an epoxy filler. The capping sleeve is placed on a fuel rod which is then severed by using a bolt cutter device. Upon cutting, the capping sleeve deforms in such a manner as to prevent the gross release of radioactive fuel material 3 Claims, 8 Drawing Figures U.S. Patent    Mar. 22, 1988    Sheet 2 of 2    4,732,730
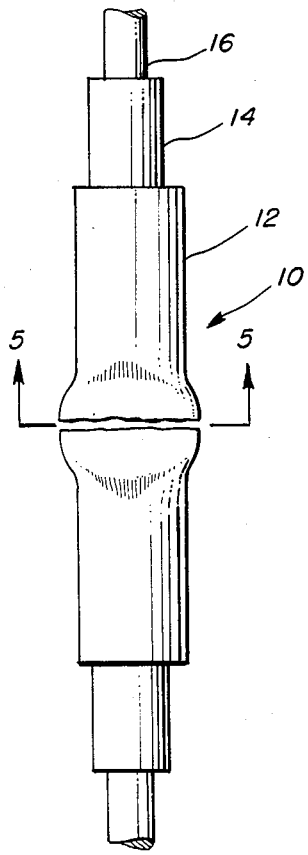
FIG. 4
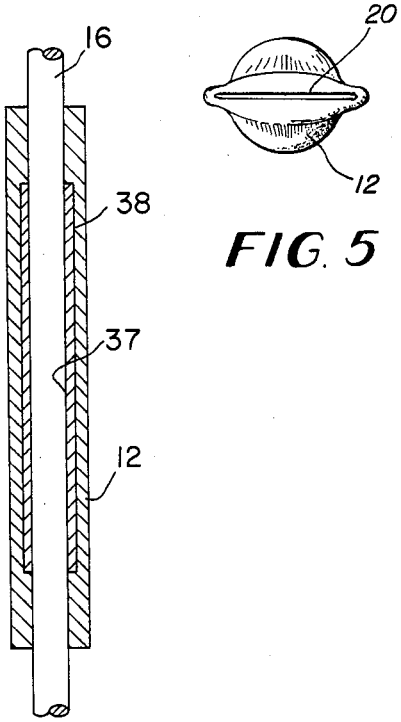
FIG. 5
FIG. 8
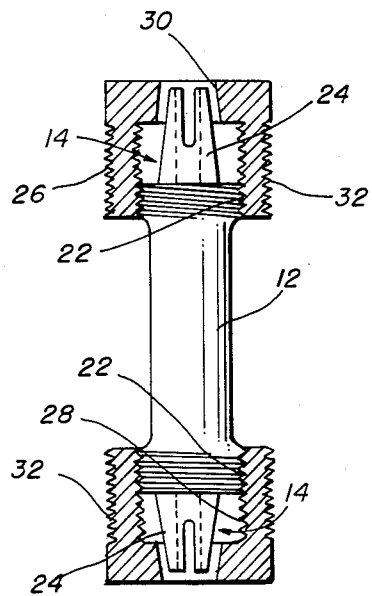
FIG. 6
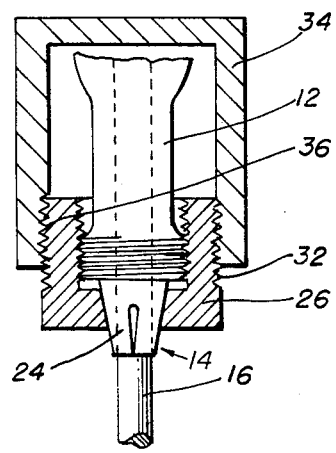
FIG. 7

STUCK FUEL ROD CAPPING SLEEVE

BACKGROUND OF THE INVENTION

1. Field of Invention

The present invention relates broadly to nuclear reactors wherein steam is generated by heat from nuclear fuel rods arranged in fuel assemblies. Periodically, these fuel rods must be replaced. In doing so the used fuel rods are removed from spent fuel assemblies. The present invention is particularly directed to a device to be used during derodding of spent fuel assemblies if a fuel rod becomes stuck in a partially withdrawn position.

2. Description of the Related Art

During the operation of a nuclear reactor, the fuel assemblies, which include cylindrical fuel rods, periodically must be renewed. This is accomplished by replacing the rods in spent fuel assemblies. Initially, the spent fuel assemblies must be derodded and on occasion a fuel rod may become stuck in a partially withdrawn position. Continued handling of the fuel assembly requires severing of the stuck fuel rod. Severing of the fuel rod using standard hydraulic shears, bolt cutters, or pipe cutters results in the gross release of radioactive debris, which is, of course, highly undesirable.

SUMMARY OF THE INVENTION

Accordingly, it is a primary object of the present invention to prevent the gross release of radioactive debris upon the severing of a spent fuel rod.

It is a further object of the present invention to accomplish the substantial closure of the severed ends of a spent fuel rod.

Another object of the present invention is to provide for the closure of the severed ends of a spent fuel rod through the use of caps or capping sleeves.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In accordance with the present invention, a stuck fuel rod capping sleeve is provided in order to permit severing of a fuel rod without the gross release of radioactive material. The stuck fuel rod capping sleeve is a bi-metallic cylindrical device made up of an inner sleeve and an outer sleeve. The inner sleeve is made of a low work hardening highly ductile material (e.g., Inconel 600). The outer sleeve is made of a moderately ductile material (e.g., 304 stainless steel).

Severing of the fuel rod is performed by using a bolt cutter device. Upon initial pressure being applied by the bolt cutter device, the bi-metallic sleeve provides strength to permit fracturing of the ceramic fuel without severing of the fuel rod cladding. Continued application of pressure by the bolt cutter device results in separation of the fractured surfaces and a closure of the rod ends. During this stage of cutting, ductile flow of the inner sleeve results in a barrier that restricts the release of radioactive fuel material. The final application of pressure by the bolt cutter device fractures the outer sleeve and results in a separation of the upper and lower portions of the fuel rod. Although the capping sleeve does not hermetically seal the fuel rod, it does prevent the gross release of radioactive fuel material.

The stuck fuel rod capping sleeve of the present invention has been tested on unirradiated LWBR fuel rod tubing and simulated (aluminum oxide) fuel pellets. Cutting forces of approximately 20,000 lbs. were needed to sever a 0.30 inch diameter fuel rod. In the tests, end gaps as small as approximately 0.0005 inch were achieved, thus demonstrating substantial closure of the severed ends of the fuel rod. Tests wherein a single Inconel capping sleeve was utilized have also been performed. Although comparable end closures were obtained, in many cases severing of the sleeve was not obtained.

In a second embodiment of the stuck fuel rod capping sleeve, each end of the inner sleeve is tapered and split in the region beyond the outer sleeve. Lower and upper locking sleeves are threaded onto threaded portions at each end of the outer sleeve prior to placement of the stuck fuel rod capping sleeve over the stuck fuel rod. Following severing of the stuck fuel rod capping sleeve and the fuel rod, the locking sleeves are advanced to seal the shank of the fuel rod to the inner sleeve and caps are threaded onto the locking sleeves to seal the severed end of the fuel rod.

In a third embodiment of the stuck fuel rod capping sleeve, a single Inconel capping sleeve with a recess is used to seal the rod. The recess is packed with an underwater epoxy prior to placing the sleeve on the rod. The epoxy reduces the amount of fission product release by providing a seal between the rod and sleeve. The epoxy also locks the capping sleeve on the fuel rod.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a side view of the stuck fuel rod capping sleeve in position on a cylindrical fuel rod after the capping sleeve and rod have been severed.

FIG. 5 is a bottom view taken along a line 5—5 in FIG. 4.

FIG. 6 shows another embodiment of the stuck fuel rod capping sleeve.

FIG. 7 shows the embodiment of FIG. 6, including the cap, in place after a fuel rod has been severed to seal the fuel rod.

FIG. 8 shows another embodiment of the stuck fuel rod capping sleeve.

DESCRIPTION OF THE PREFERRED EMBODIMENTS

Figure 1:
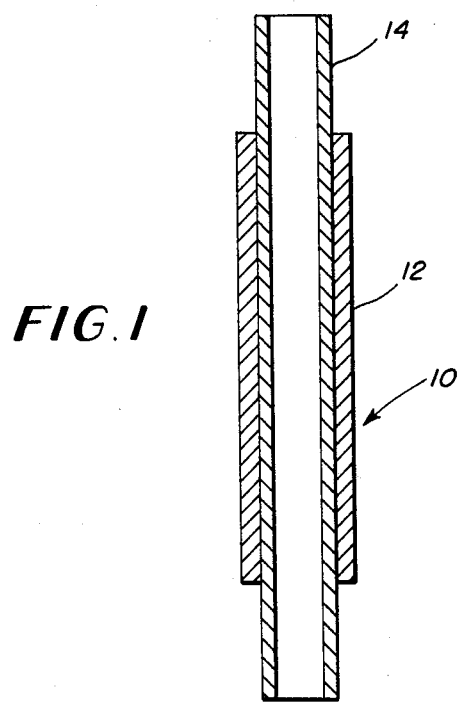
FIG. 1 is a side view, in section, of a stuck fuel rod capping sleeve embodying the invention.
Figure 2:
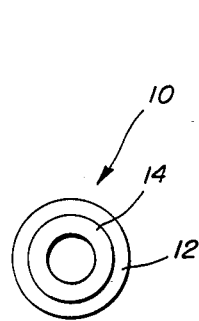
FIG. 2 shows a top plan view of the stuck fuel rod capping sleeve shown in FIG. 1.

Referring in detail to the drawings, there is illustrated in FIGS. 1 and 2 a first embodiment of the stuck fuel rod capping sleeve 10 of the present invention. The stuck fuel rod capping sleeve 10 is made up of two cylindrical members fastened together with outer sleeve 12 surrounding a longer inner sleeve 14. The outer sleeve 12 is made of a moderately ductile material (e.g., 304 stainless steel), while the inner sleeve 14 is made of a low work hardening, highly ductile material (e.g., Inconel 600).

Figure 3:
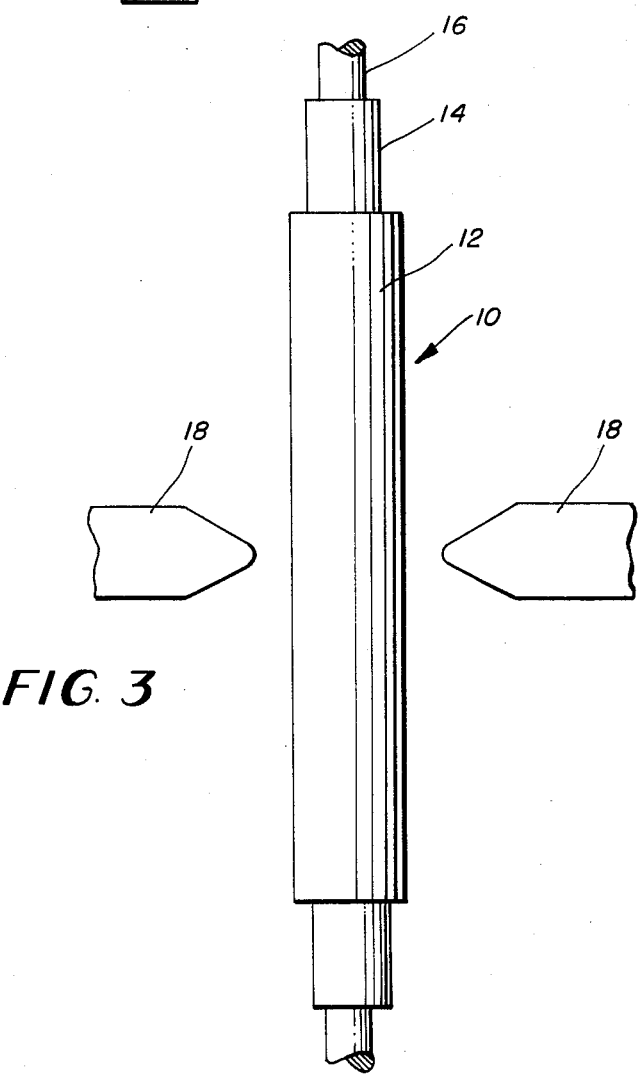
FIG. 3 is a side view of the stuck fuel rod capping sleeve in position on a cylindrical fuel rod with a bolt cutter device about to sever the rod.

As shown in FIG. 3, the stuck fuel rod capping sleeve 10 is placed on a spent cylindrical fuel rod 16, which has become stuck in a fuel assembly. After the capping sleeve is in place, the capping sleeve together with the fuel rod 16 are severed through the use of a bolt cutter device 18.

The bi-metallic capping sleeve provides strength to permit fracturing of the ceramic fuel without severing the fuel rod cladding upon the initial application of pressure by the bolt cutter 18. During the continued application of pressure, the fractured surfaces separate and there is a closure of each of the rod ends since the ductile flow of the inner sleeve 14 results in a barrier that restricts the release of radioactive fuel material. The bolt cutter 18, with a final application of pressure, fractures the outer sleeve and results in a separation of the upper and lower portions of the fuel rod 16 as illustrated in FIG. 4.

The capping sleeve 10 does not hermetically seal the ends of the severed fuel rod 16. However, it does prevent the gross release of radioactive fuel material by leaving only a small residual opening 20, as shown in FIG. 5, to communicate with the interior of a fuel rod 16 after the fuel rod has been severed into two pieces.

FIGS. 6 and 7 illustrate a second embodiment of the present invention. In this embodiment, the outer sleeve 12 has threads 22 at each end thereof. The inner sleeve 14 is provided with a tapered and split portion 24 at each end. Locking sleeves 26, each of which has interior threads 28, are threaded onto the threads 22 located at each end of the outer sleeve 12 prior to placement of the stuck fuel rod capping sleeve over the stuck fuel rod. Each sleeve 26 also has a tapered portion 30 which cooperates with the tapered and split portion 24 of the inner sleeve 14. The tapered portion 30 contracts the split portion 24 so that it grasps the fuel rod 16 when the locking sleeve 26 is threaded onto the outer sleeve in the manner shown in FIG. 7 with a fuel rod present in the stuck fuel rod capping sleeve. With this arrangement, the inner sleeve 14 provides a seal around the fuel rod 16.

Each locking sleeve 26 also has threads 32 located on its outer surface. After the fuel rod 16 has been severed, the end of the rod may be completely sealed off through the use of a cap 34. As shown in FIG. 7, cap 34 has threads 36 on its interior surface which mate with the threads 32 on the exterior of the locking sleeve 26. Thus, after severing the fuel rod, the cap 34 is threaded onto each locking sleeve 26 to seal the severed end of the fuel rod 16. As noted previously, advancement of locking sleeve 26 through the engagement of threads 22 and 28 seals the shank of the fuel rod 16 to the inner sleeve.

Through the use of this embodiment, a severed fuel rod can be completely sealed off so that release of radioactive debris is prevented.

FIG. 8 illustrates a third embodiment of the present invention. In this embodiment, the outer sleeve 12 has an internal recess 37. The inner sleeve 14 is not utilized in this embodiment. An underwater epoxy 38 is packed into the recess prior to placement of the sleeve 12 on the stuck fuel rod 16. The sleeve 12 is placed on the fuel rod 16 and the rod is then severed before the epoxy hardens. The epoxy reduces the amount of fission product released by capturing fuel debris and locks the capping sleeve on the fuel rod when it hardens.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stuck fuel rod capping sleeve comprising:
    an inner cylindrical sleeve made of low work hardening, highly ductile material and having tapered and split end portions;
    an outer cylindrical sleeve made of moderately ductile material and mounted on the inner cylindrical sleeve, the outer cylindrical sleeve having threads located at each end thereof; and
    a locking sleeve threaded on each end of the outer cylindrical sleeve, each locking sleeve having threads located on its exterior surface.

2. A stuck fuel rod capping sleeve as recited in claim 1, wherein a cap is threaded on each said locking sleeve.

3. A stuck fuel rod capping sleeve comprising:
    an inner cylindrical sleeve made of low work hardening, highly ductile material and having tapered and split end portions;
    an outer cylindrical sleeve made of moderately ductile material and mounted on the inner cylindrical sleeve, the outer cylindrical sleeve having threads located at each end thereof; and
    a locking sleeve threaded on each end of the outer cylindrical sleeve, each locking sleeve having a tapered portion formed to cooperate with the tapered and split end portions of the inner cylindrical sleeve.

* * * * *